US007894395B2

(12) United States Patent
Yi et al.

(10) Patent No.: US 7,894,395 B2
(45) Date of Patent: *Feb. 22, 2011

(54) METHOD OF ALLOCATING RESOURCES IN WIRELESS COMMUNICATION SYSTEM

(75) Inventors: Seung June Yi, Gyeongki-do (KR);
Young Dae Lee, Gyeongki-do (KR);
Sung Duck Chun, Gyeongki-do (KR);
Sung Jun Park, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/312,781

(22) PCT Filed: Jun. 17, 2008

(86) PCT No.: PCT/KR2008/003401

§ 371 (c)(1),
(2), (4) Date: Oct. 20, 2009

(87) PCT Pub. No.: WO2008/156275

PCT Pub. Date: Dec. 24, 2008

(65) Prior Publication Data

US 2010/0118796 A1  May 13, 2010

Related U.S. Application Data

(60) Provisional application No. 60/945,580, filed on Jun. 21, 2007.

(30) Foreign Application Priority Data

Jun. 18, 2007  (KR) ............ 10-2007-0059524

(51) Int. Cl.
*H04W 4/00* (2009.01)
*H04B 7/00* (2006.01)

(52) U.S. Cl. ............ 370/329; 370/338; 370/341

(58) Field of Classification Search .............. None
See application file for complete search history.

(56) References Cited

U.S. PATENT DOCUMENTS

| 7,505,448 | B2 * | 3/2009 | Sheng et al. | 370/350 |
|---|---|---|---|---|
| 7,509,554 | B2 * | 3/2009 | Lohr et al. | 714/748 |
| 7,590,089 | B2 * | 9/2009 | Park et al. | 370/329 |
| 2004/0185892 | A1 | 9/2004 | Iacono et al. | |

(Continued)

FOREIGN PATENT DOCUMENTS

EP  1 209 940  5/2002

(Continued)

*Primary Examiner*—Chi H Pham
*Assistant Examiner*—Soon-Dong D Hyun
(74) *Attorney, Agent, or Firm*—McKenna Long & Aldridge LLP

(57) ABSTRACT

A method of allocating resources in a wireless communication system includes configuring priorities for a plurality of logical channels according to a first criterion, wherein each of the plurality of logical channels has each priority and allocating resources to a subset of the plurality of logical channels according to a second criterion to transfer data through a transport channel, wherein the subset of the plurality of logical channels is configured with same priority. It is possible to reliably provide various services through a method of processing radio bearers having the equal priorities.

28 Claims, 11 Drawing Sheets

U.S. PATENT DOCUMENTS

| | | | |
|---|---|---|---|
| 2005/0107091 A1* | 5/2005 | Vannithamby et al. | 455/453 |
| 2005/0143082 A1* | 6/2005 | Yang | 455/452.1 |
| 2005/0185609 A1* | 8/2005 | Malkamaki | 370/328 |
| 2006/0215612 A1* | 9/2006 | Chemiakina et al. | 370/332 |
| 2007/0115915 A1* | 5/2007 | Sheng et al. | 370/350 |

FOREIGN PATENT DOCUMENTS

| | | |
|---|---|---|
| EP | 1 424 865 | 6/2004 |
| EP | 1 511 245 | 3/2005 |
| EP | 1 672 941 | 6/2006 |
| EP | 1 708 524 | 10/2006 |
| EP | 1 986 455 | 10/2008 |

\* cited by examiner

[Fig. 1]
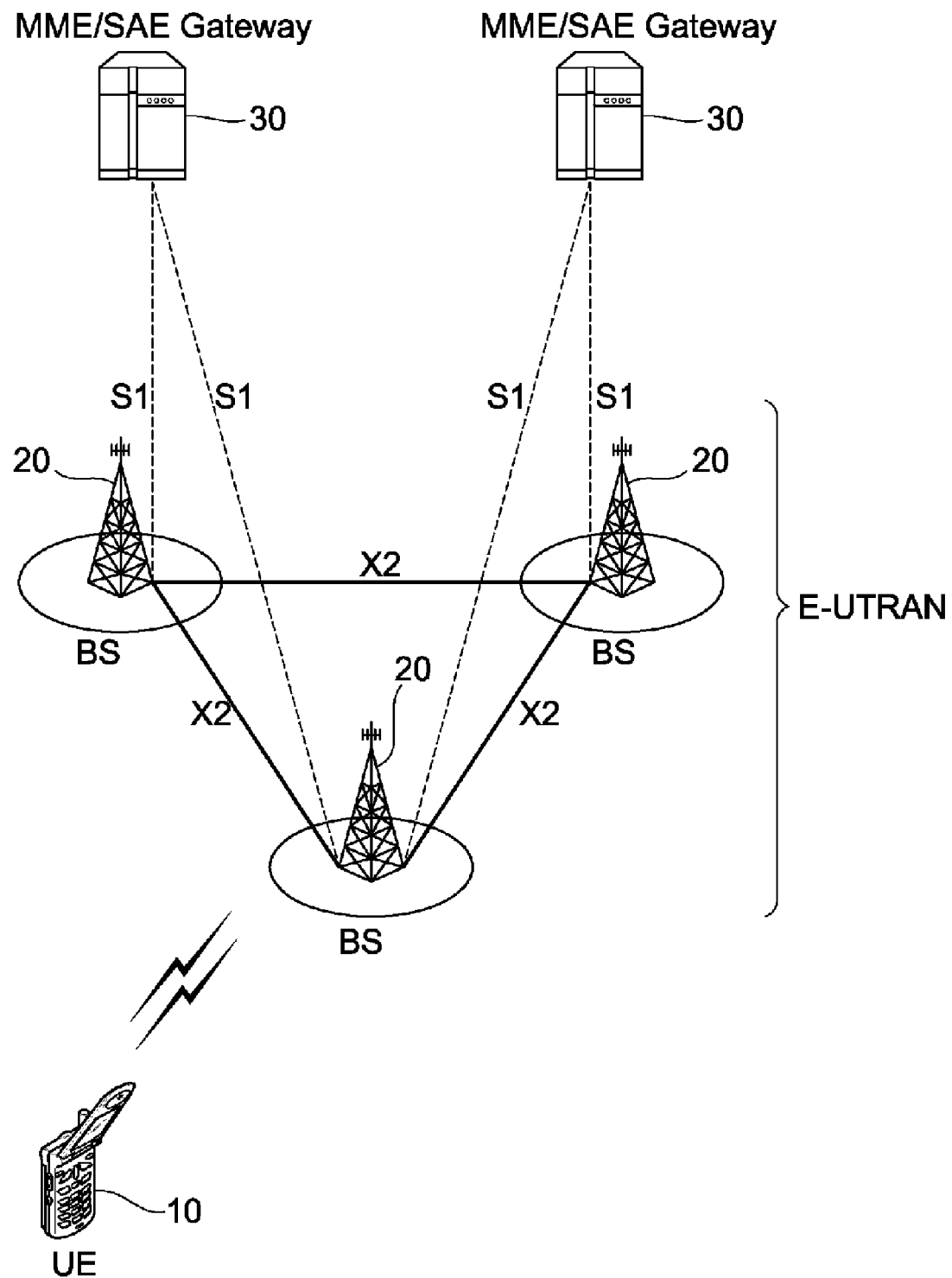

[Fig. 2]
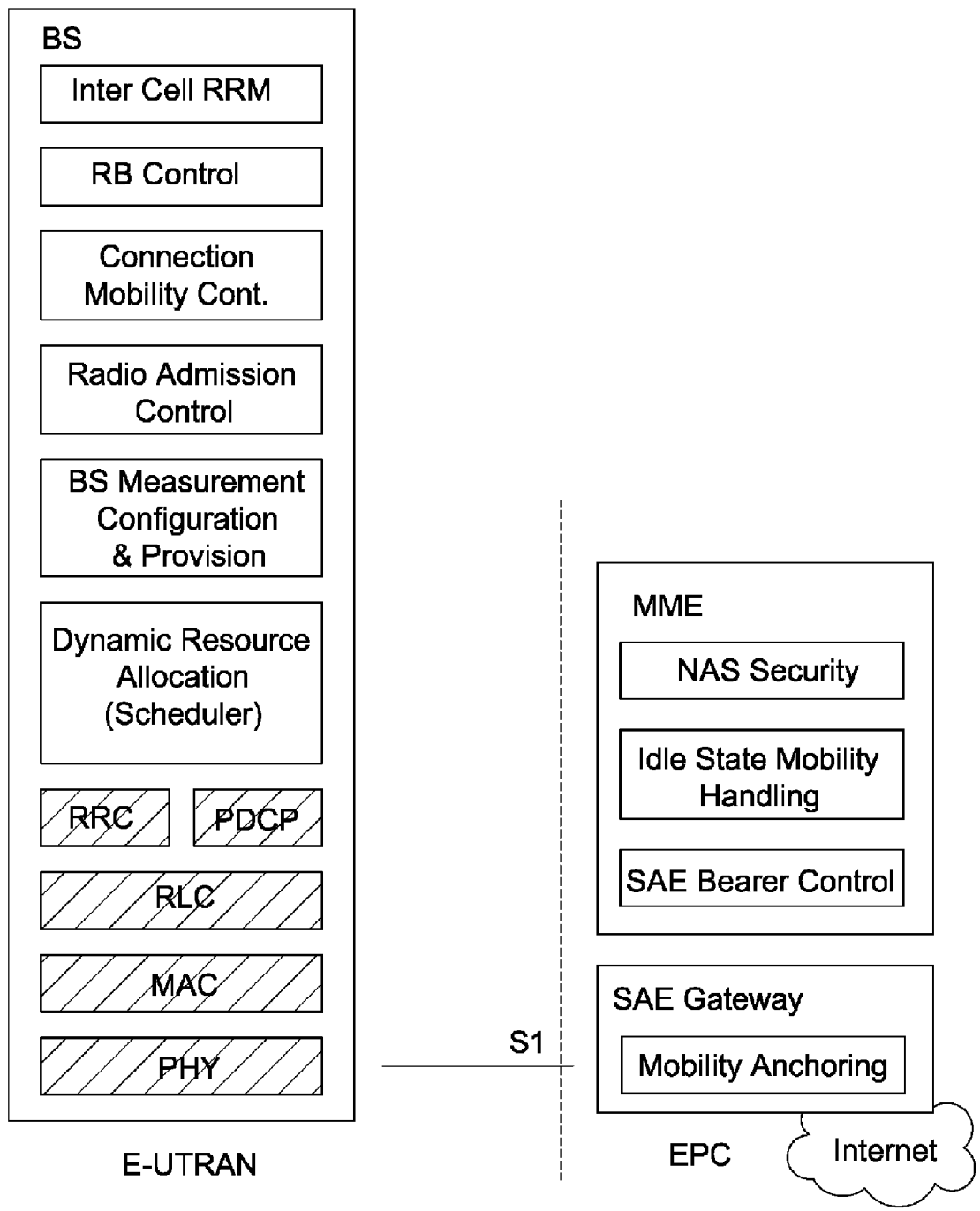

[Fig. 3]
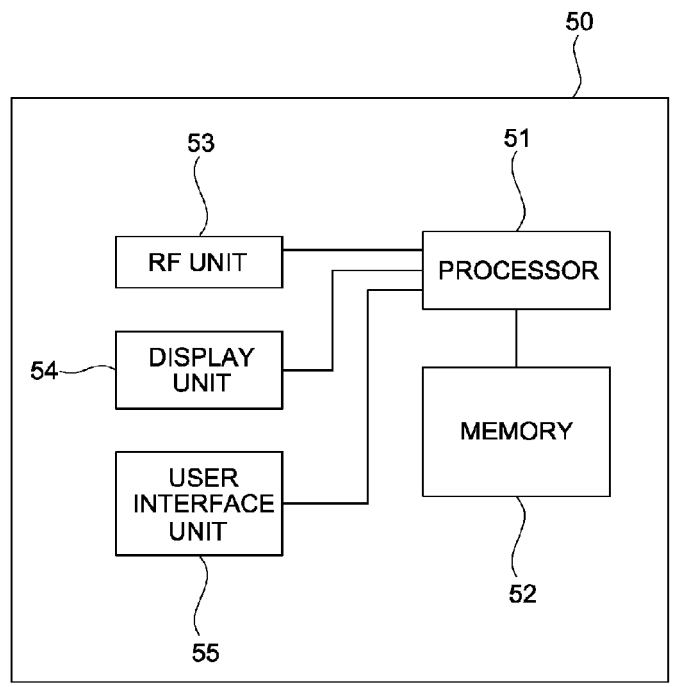
[Fig. 4]
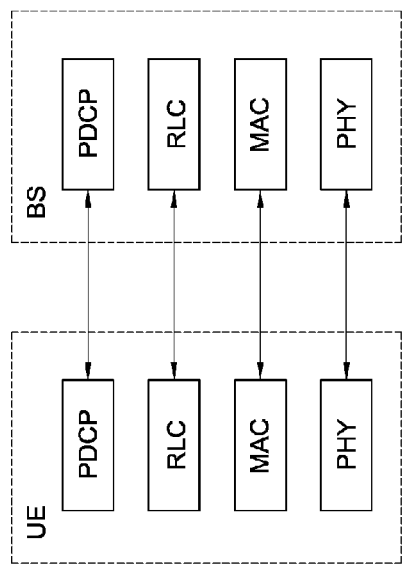

[Fig. 5]
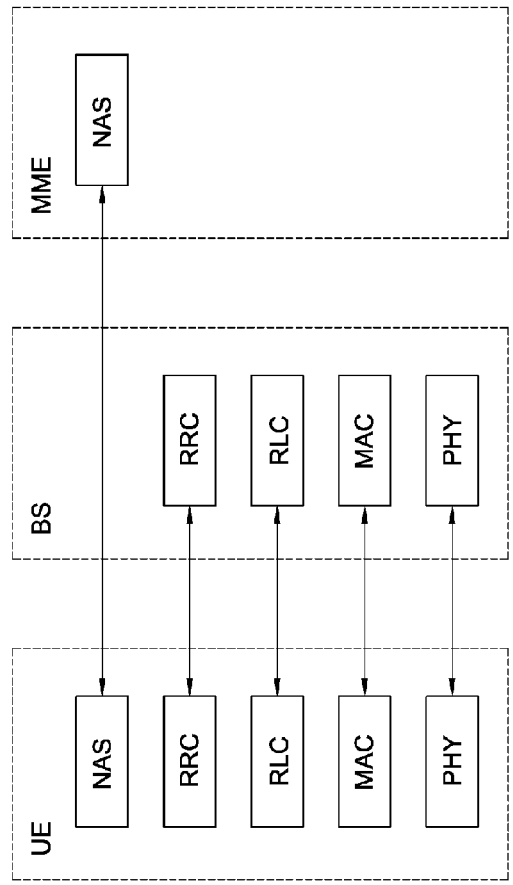
[Fig. 6]
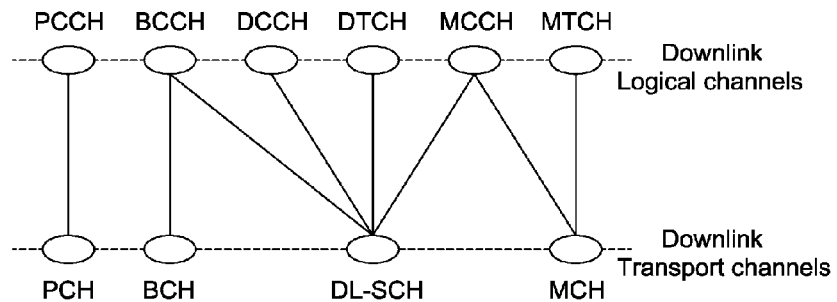
[Fig. 7]
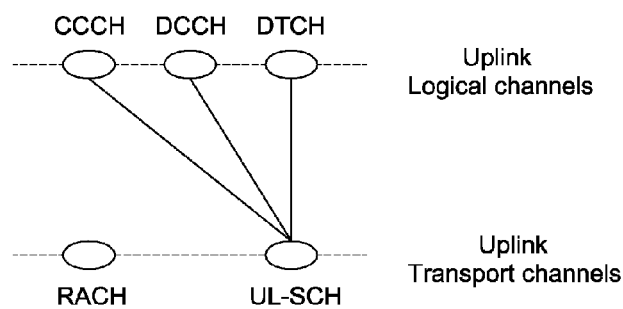

[Fig. 8]
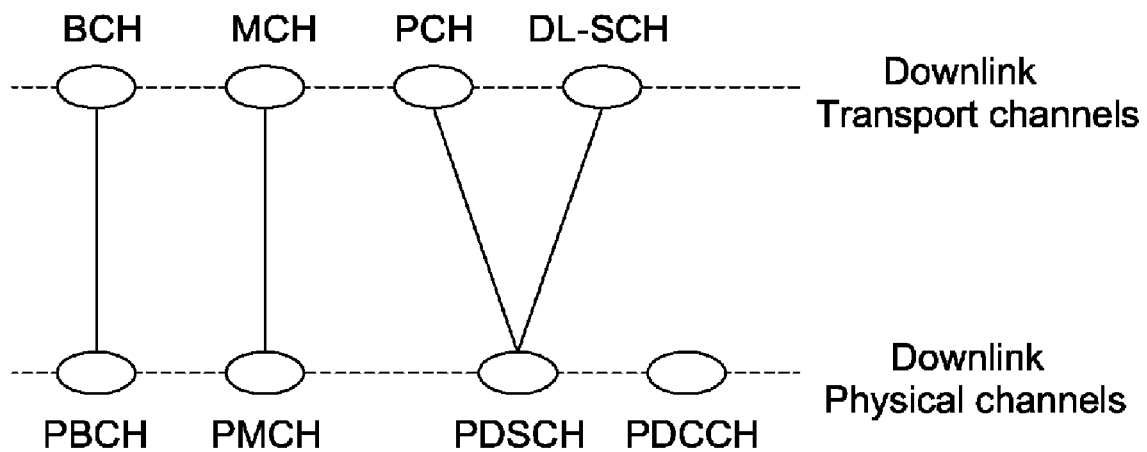
[Fig. 9]
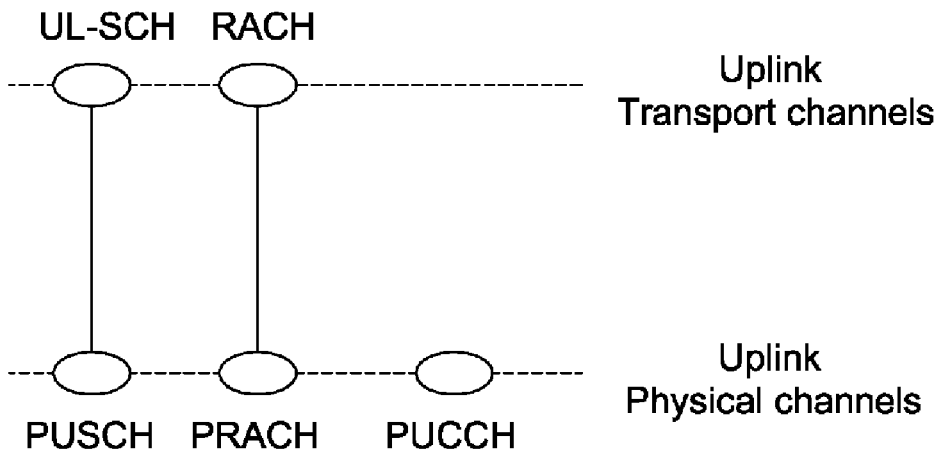

[Fig. 11]
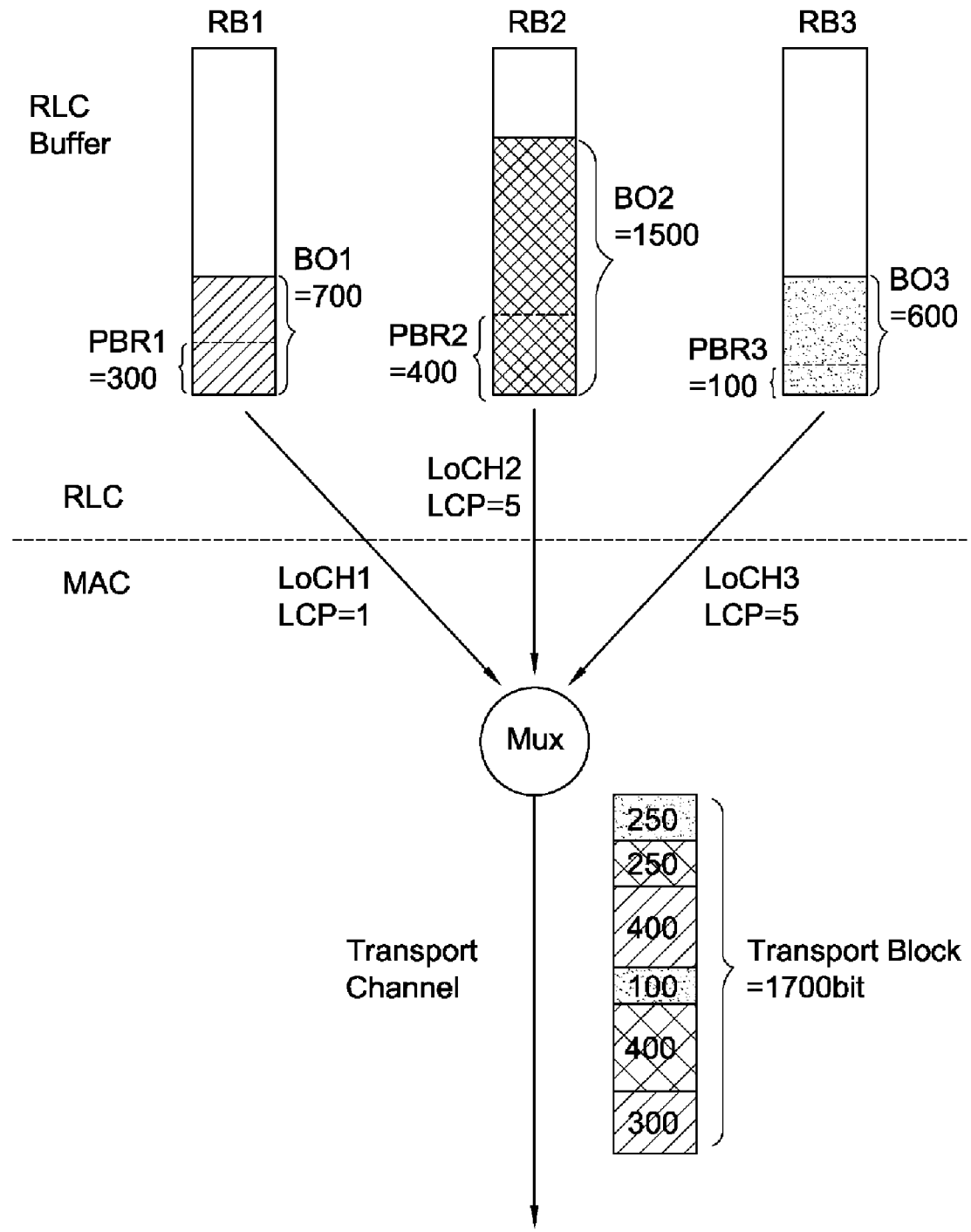

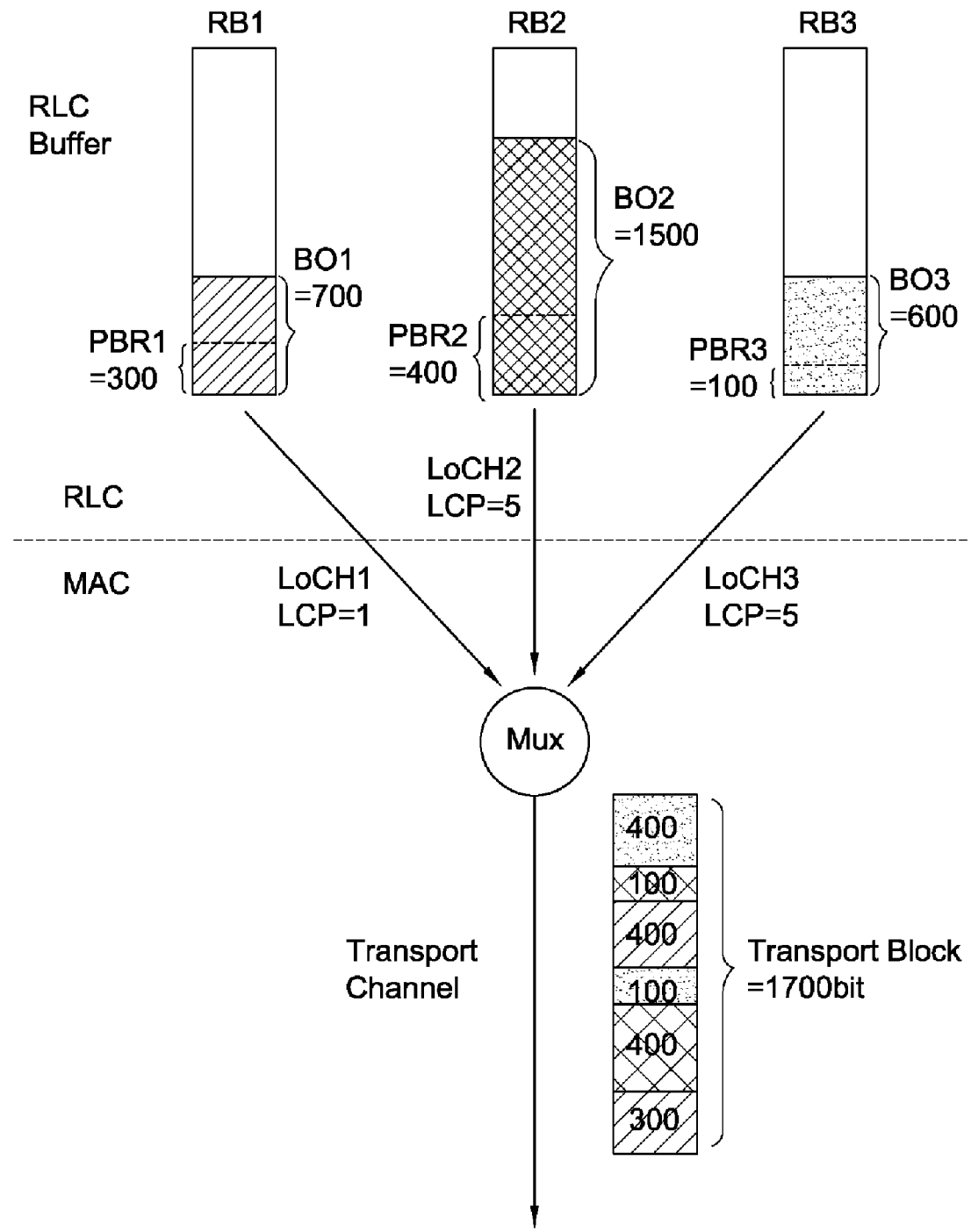
[Fig. 12]

[Fig. 13]
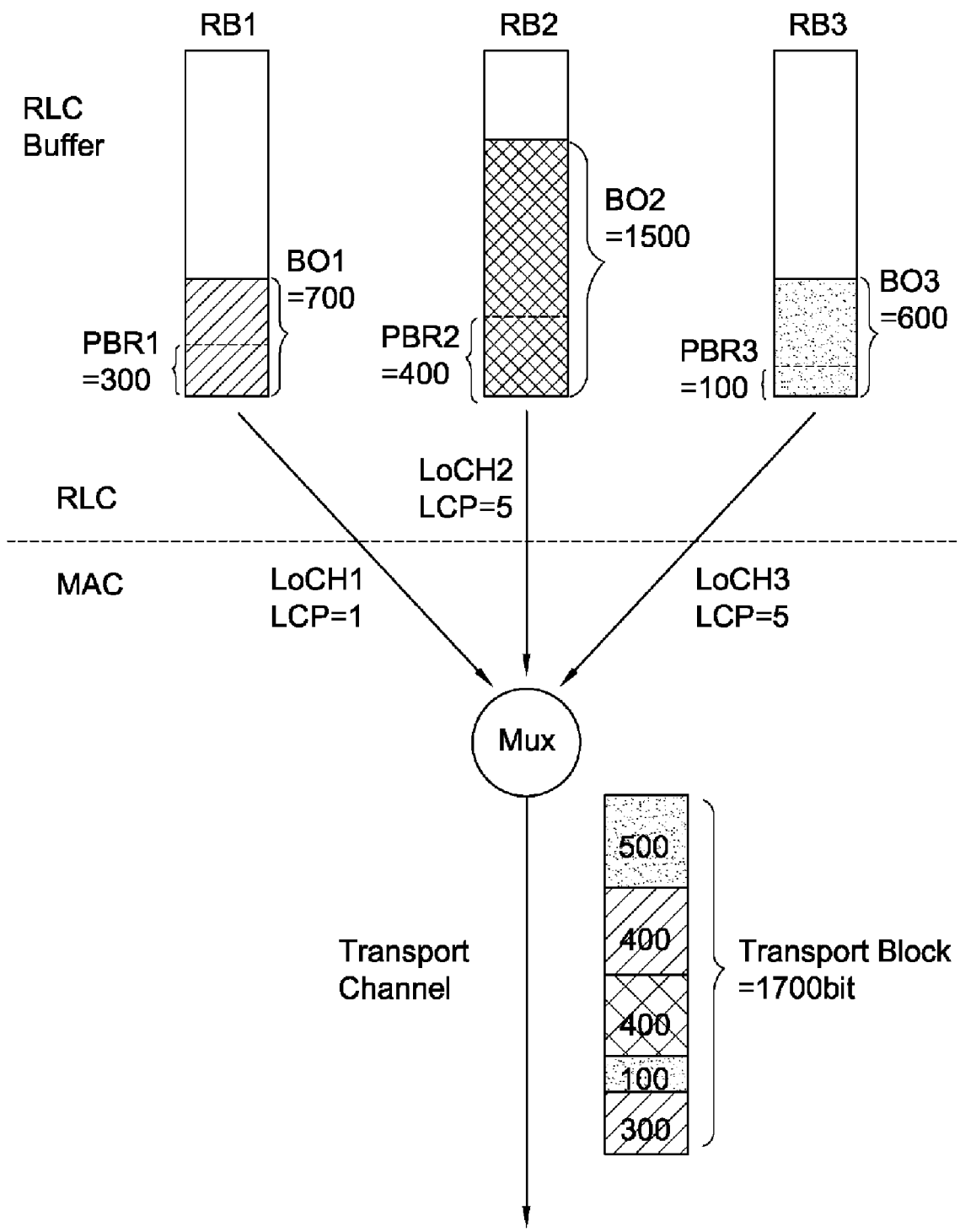

[Fig. 14]
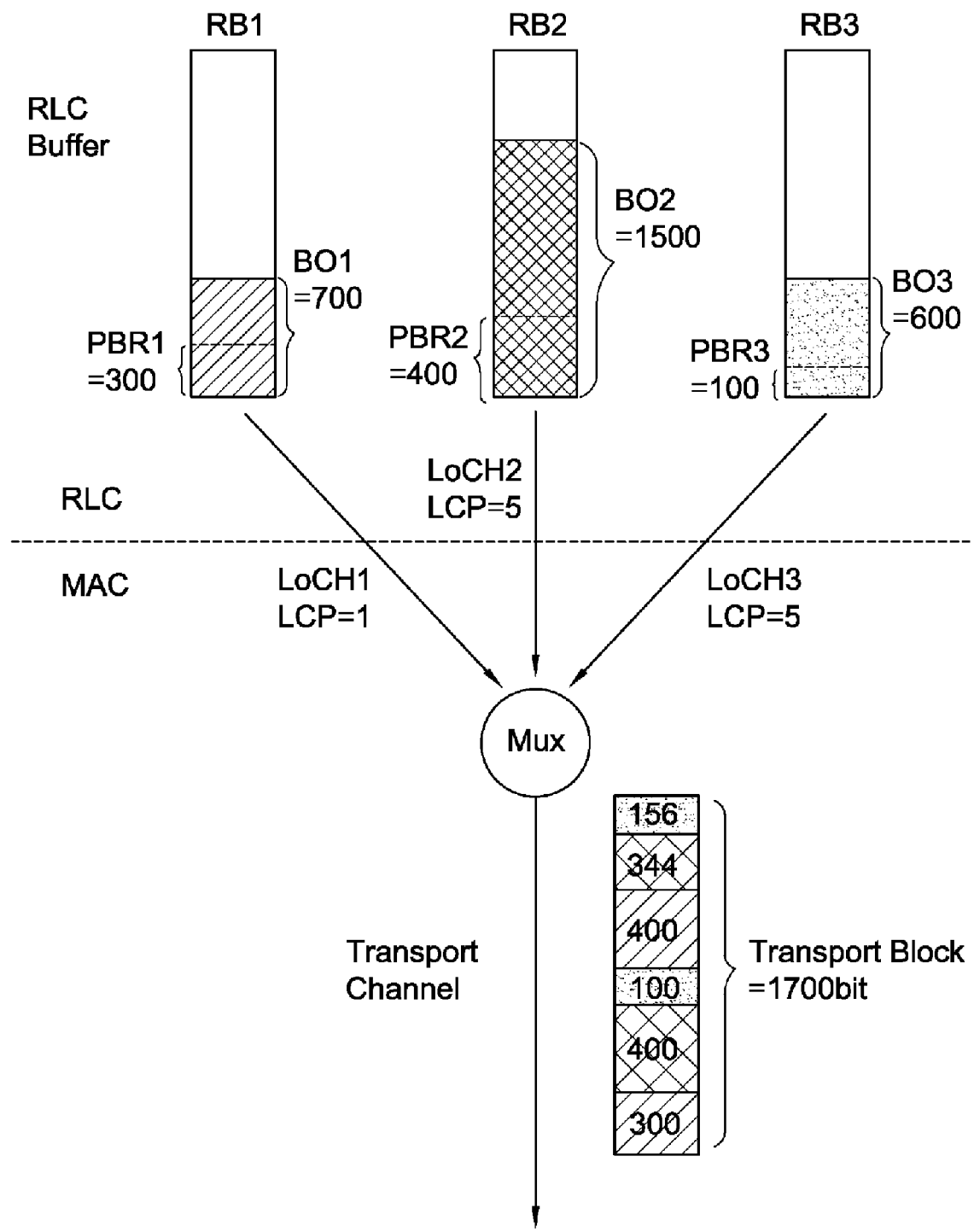

[Fig. 15]
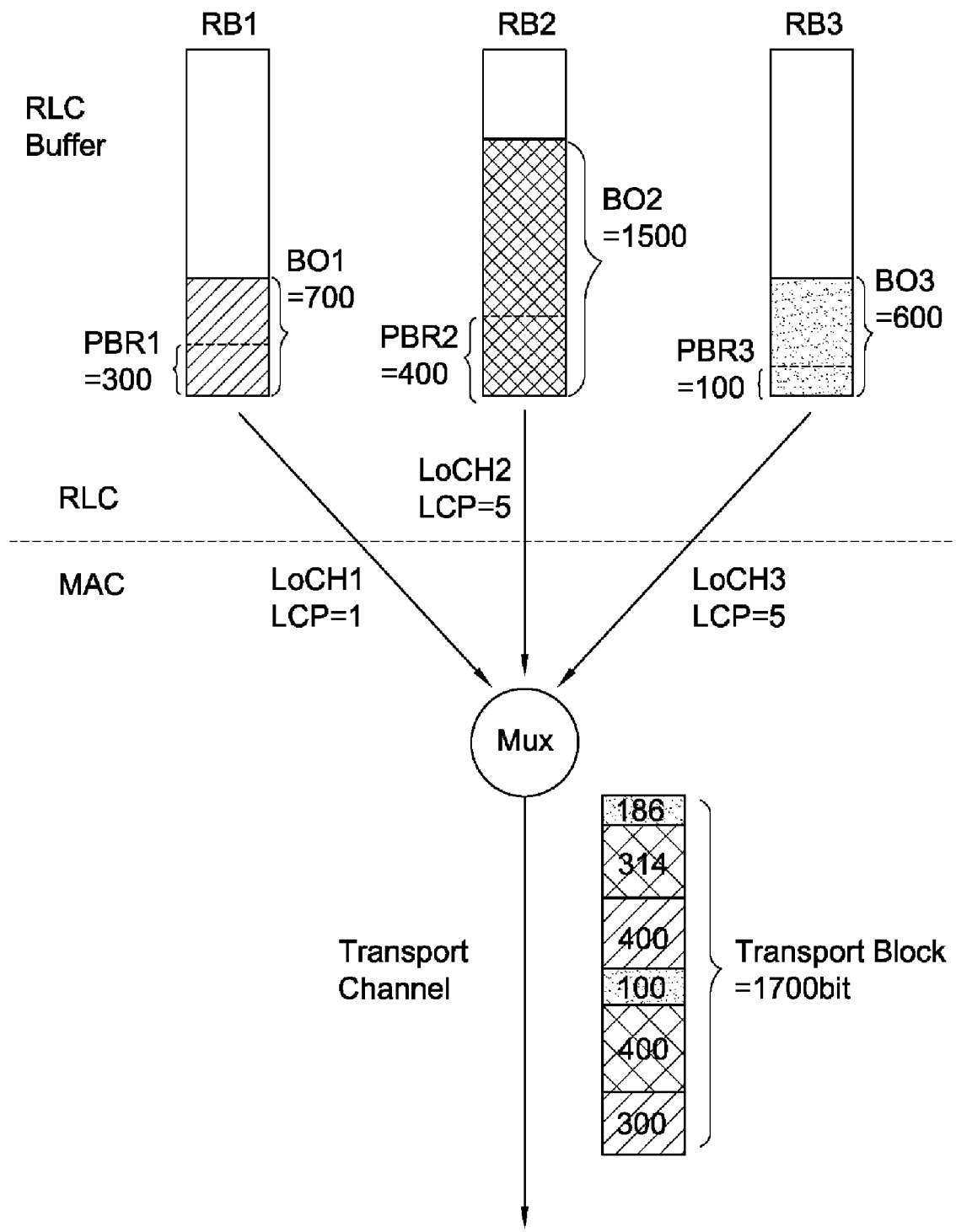

METHOD OF ALLOCATING RESOURCES IN WIRELESS COMMUNICATION SYSTEM

This application is a national stage entry of International Application No. PCT/KR2008/003401, filed Jun. 17, 2008, and claims the benefit of Korean Application No. 10-2007-0059524, filed on Jun. 18, 2007, and U.S. Application No. 60/945,580, filed Jun. 21, 2007, each of which are hereby incorporated by reference in their entireties for all purposes as if fully set forth herein.

TECHNICAL FIELD

The present invention relates to a wireless communication process, and more particularly, to a method of allocating resources in a wireless communication system.

BACKGROUND ART

A third generation partnership project (3GPP) mobile system based on a wideband code division multiple access (WCDMA) radio access technology has been widely deployed all over the world. A high-speed downlink packet access (HSDPA), which is a first step in the evolution of the WCDMA, provides the 3GPP with a radio access technology having high competitiveness. However, since radio access technology has been continuously developed in view of requirements and expectations of users and providers, evolution of a new technology in the 3GPP is required to increase competitiveness. There are required reduced cost per bit, increased service availability, flexible use of a frequency band, a simple structure and an open interface, and adequate power consumption of a user equipment.

A wireless communication system needs to provide various radio services such as a web browsing service, a voice over internet protocol (VoIP) service, in addition to a voice service. In order to provide various radio services, at least one radio bearer has to be set up between a base station and a user equipment. Radio bearers can be configured with different priorities or equal priorities. For example, although the voice service uses a relatively small amount of transmission rate but needs to minimize transmission delay. On the contrary, a web browsing service needs a relatively large amount of transmission rate but does not matter transmission delay. A plurality of radio bearers are configured so as to support various applications and concurrently provide various radio services. The plurality of radio bearers may have different priorities or equal priorities like in a case where a plurality of web browsers are concurrently provided.

A method is sought for efficiently allocating resources to the plurality of radio bearers having priorities.

DISCLOSURE OF INVENTION

Technical Problem

The present invention provides a method of allocating resources to a plurality of radio bearers having equal priorities.

The present invention also provides a method of allocating resources to a plurality of logical channels having equal priorities.

Technical Solution

In an aspect, a method of allocating resources in a wireless communication system is provided. The method includes configuring priorities for a plurality of logical channels according to a first criterion, wherein each of the plurality of logical channels has each priority and allocating resources to a subset of the plurality of logical channels according to a second criterion to transfer data through a transport channel, wherein the subset of the plurality of logical channels is configured with same priority.

In another aspect, a method of transmitting data from an upper layer to a lower layer is provided. The method includes determining transmission priorities of a plurality of logical channels to transmit data of the plurality of logical channels according to a criterion, wherein the plurality of logical channels have same logical channel priorities, and transmitting the data of the plurality of logical channels based on the determined transmission priorities.

In still another aspect, a method of allocating resources in a wireless communication system is provided. The method includes configuring a priority for each logical channel according to a first criterion and allocating resources in a transport channel according to a second criterion, wherein the transport channel is mapped to a plurality of logical channels configured with same priority.

In still another aspect, a method of allocating resources in a wireless communication system is provided. The method includes configuring a priority for each logical channel according to a first criterion and allocating resources in a transport channel, the transport channel being mapped to a plurality of logical channels configured with same priority, the plurality of logical channels having same amount of transmission data.

Advantageous Effects

As a communication system has been developed, there is a need to run multiple applications and to concurrently provide various services. Specifically, when a plurality of radio bearers having equal priorities are concurrently configured like a case where a plurality of web browsers are concurrently used, quality of service may not be guaranteed if any efficient method of processing equal priorities is not available. Accordingly, it is possible to reliably provide various services through a method of processing radio bearers having the equal priorities.

BRIEF DESCRIPTION OF THE DRAWINGS

FIG. 1 is a block diagram showing a wireless communication system.

FIG. 2 is a block diagram showing functional split between the E-UTRAN and the EPC.

FIG. 3 is a block diagram showing constitutional elements of a UE.

FIG. 4 is a block diagram showing radio protocol architecture for a user plane.

FIG. 5 is a block diagram showing radio protocol architecture for a control plane.

FIG. 6 shows mapping between downlink logical channels and downlink transport channels.

FIG. 7 shows mapping between uplink logical channels and uplink transport channels.

FIG. 8 shows mapping between downlink transport channels and downlink physical channels.

FIG. 9 shows mapping between uplink transport channels and uplink physical channels.

FIG. 11 illustrates a method of allocating equal amounts of transmission data except prioritized bit rate (PBR) allocation.

FIG. 12 illustrates a method of allocating equal amounts of transmission data including PBR allocation.

FIG. 13 illustrates a method of enabling an RB having a lower PBR to have a higher priority with respect to RBs having equal LCPs.

FIG. 14 illustrates a method of allocating amounts of transmission data according to a ratio of a criterion except PBR allocation.

FIG. 15 illustrates a method of allocating amounts of transmission data according to a ratio of a criterion including PBR allocation.

MODE FOR THE INVENTION

Figure 10:
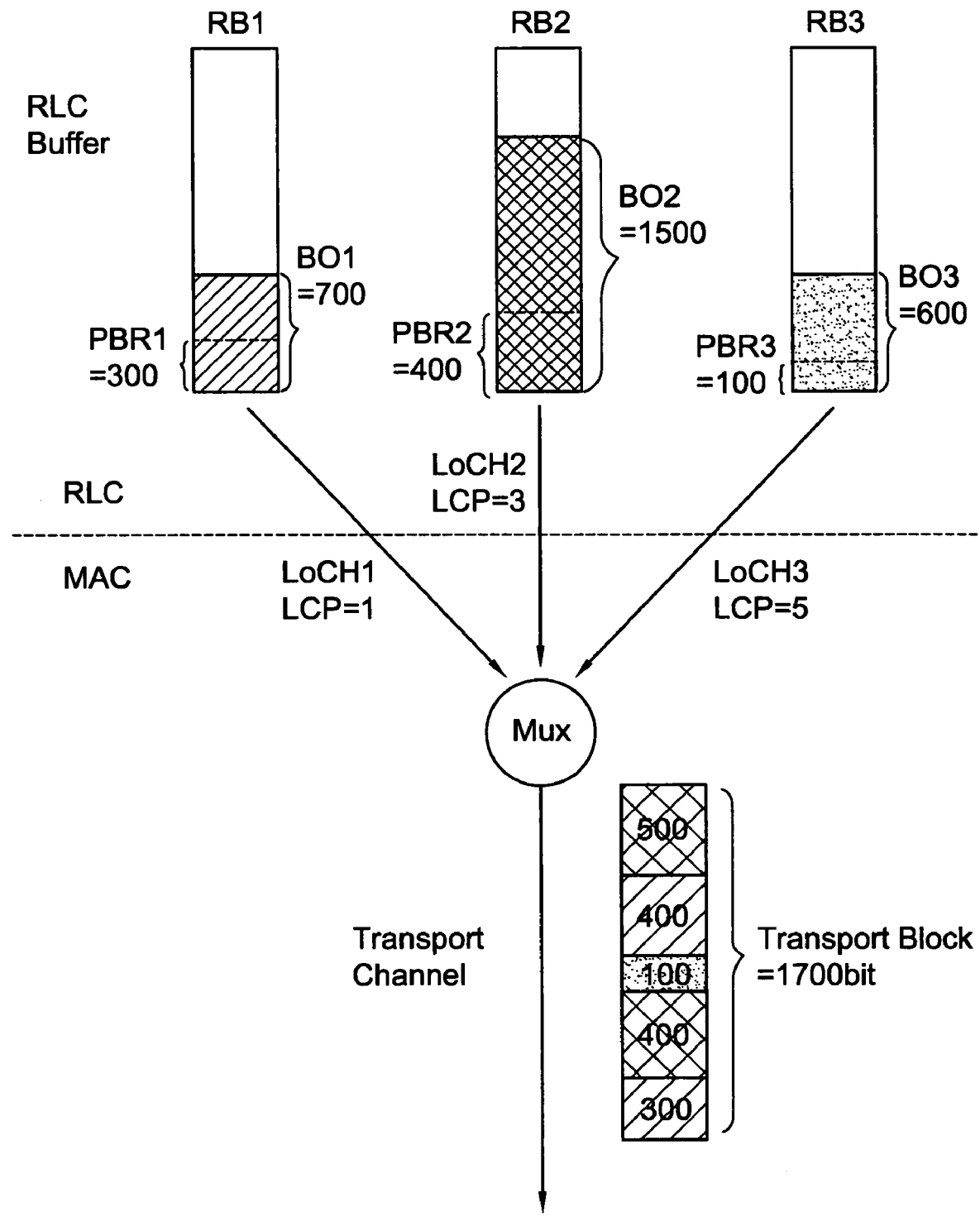
FIG. 10 illustrates an example of a method of transmitting data having different logical channel priorities (LCPs).

FIG. 1 is a block diagram showing a wireless communication system. This may be a network structure of an E-UMTS (Evolved-Universal Mobile telecommunications System). The E-UMTS system may be referred to as an LTE (Long-term Evolution) system. The wireless communication system can widely be deployed to provide a variety of communication services, such as voices, packet data, and the like.

Referring to FIG. 1, an E-UTRAN (Evolved-UMTS Terrestrial Radio Access Network) includes at least one base station (BS) 20. A user equipment (UE) 10 can be fixed or mobile and can be referred to as another terminology, such as a MS (Mobile Station), a UT (User Terminal), a SS (Subscriber Station), a wireless device, or the like. The BS 20 generally is a fixed station that communicates with the user equipment 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. Hereinafter, downlink means communication from the BS 20 to the UE 10, and uplink means a communication from the UE 10 to the BS 20.

The BSs 20 are interconnected with each other by means of an X2 interface. The BSs 20 are also connected by means of the S1 interface to the EPC (Evolved Packet Core), more specifically to the MME (Mobility Management Entity)/SAE (System Architecture Evolution) Gateway. The S1 interface supports a many-to-many relation between MME/SAE Gateway 30 and the BS 20.

FIG. 2 is a block diagram showing functional split between the E-UTRAN and the EPC. Slashed boxes depict radio protocol layers and white boxes depict the functional entities of the control plane.

Referring to FIG. 2, a BS hosts the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling.

The MME hosts the following functions. (1) Dispersion of paging messages over the BSs, (2) Security control, (3) Idle state mobility control, (4) SAE bearer control, and (5) Ciphering and integrity protection of non-access stratum (NAS) signaling.

An SAE gateway hosts the following functions. (1) Termination of a user plane packet with respect to paging and (2) Switching of a user plane for supporting mobility of the UE.

FIG. 3 is a block diagram showing constitutional elements of a UE. A UE 50 includes a processor 51, memory 52, a RF unit 53, a display unit 54 and a user interface unit 55. Layers of the radio interface protocol are implemented in the processor 51. The processor 51 provides a control plane and a user plane. The function of each layer can be implemented in the processor 51. The memory 52 is coupled to the processor 51 and stores an operating system, applications, and general files. The display unit 54 displays a variety of information of the UE and may use a well-known element, such as an LCD (Liquid Crystal Display) or OLED (Organic Light Emitting Diode. The user interface unit 55 can be configured with a combination of well-known user interfaces such as a keypad or touch screen. The RF unit 53 is coupled to the processor 51 and transmits and/or receives radio signals.

Layers of the radio interface protocol between the user equipment and the base station can be classified into L1 layer (a first layer), L2 layer (a second layer), and L3 layer (a third layer) based on the lower three layers of the Open System Interconnection (OSI) model that is well-known in the related art. A physical (PHY) layer belonging to the first layer provides information transfer service on a physical channel. A radio resource control (RRC) layer belonging to the third layer serves to control radio resources between the user equipment and the network. The user equipment and the network exchange RRC messages via the RRC layer.

FIG. 4 is a block diagram showing radio protocol architecture for a user plane. FIG. 5 is a block diagram showing radio protocol architecture for a control plane. They illustrate the architecture of a radio interface protocol between the UE and the E-UTRAN. The data plane is a protocol stack for user data transmission and the control plane is a protocol stack for control signal transmission.

Referring to FIGS. 4 and 5, a physical (PHY) layer belonging to the first layer offers information transfer services to upper layers on a physical channel. The PHY layer is coupled with a MAC (Medium Access Control) layer, i.e., an upper layer of the PHY layer, through a transport channel. Data is transferred between the MAC layer and the PHY layer through the transport channel. Between different physical layers, i.e., the physical layer of a transmitter and the physical layer of a receiver, data are transferred through the physical channel. The physical channel may be modulated by orthogonal frequency division multiplexing (OFDM). The physical channel may use a time and a frequency as radio resources.

The MAC layer in the second layer provides services to a RLC (Radio Link Control) layer, i.e., an upper layer of the MAC layer, through a logical channel. The RLC layer in the second layer supports reliable data transfer. There are three operating modes in the RLC layer, such as TM (Transparent Mode), UM (Unacknowledged Mode) and AM (Acknowledged Mode) according to a data transfer method. The AM RLC provides bidirectional data transmission service and supports re-transmission when the transfer of a RLC PDU (Protocol Data Unit) is failed.

A PDCP (Packet Data Convergence Protocol) belonging to the second layer performs header compression function. The PDCP layer reduces the header size of the Internet Protocol (IP) packet so as to efficiently transmit the IP packet.

A RRC (Radio Resource Control) layer belonging to the third layer is defined only in the control plane. The RRC layer serves to control the logical channel, the transport channel, and the physical channel in association with configuration, reconfiguration and release of radio bearers (RBs). A RB means a service provided by the second layer for data transmission between the user equipment and the network. When a RRC connection is established between the RRC layer of the user equipment and the RRC layer of the network, it is called that the user equipment is in the RRC connected mode. When a RRC connection is not established yet, it is called that the user equipment is in the RRC idle mode.

A NAS (Non-Access Stratum) layer belonging to the upper layer of the RRC layer serves to perform session management and mobility management.

FIG. 6 shows mapping between downlink logical channels and downlink transport channels. FIG. 7 shows mapping between uplink logical channels and uplink transport channels.

Referring to FIGS. 6 and 7, in downlink, a paging control channel (PCCH) can be mapped to a paging channel (PCH). A broadcast control channel (BCCH) can be mapped to a broadcast channel (BCH) or a downlink shared channel (DL-SCH). A common control channel (CCCH), a dedicated control channel (DCCH), a dedicated traffic channel (DTCH), a multicast control channel (MCCH) and a multicast traffic channel (MTCH) can be mapped to the DL-SCH. The MCCH and MTCH can also be mapped to a multicast channel (MCH). In uplink, a CCCH, a DCCH and a DTCH can be mapped to a uplink shared channel (UL-SCH).

Each logical channel type is defined by what type of information is transferred. A classification of logical channels is into two groups: control channels and traffic channels.

Control channels are used for transfer of control plane information. The BCCH is a downlink control channel for broadcasting system control information. The PCCH is a downlink channel that transfers paging information and is used when the network does not know the location cell of the UE. The CCCH is a channel for transmitting control information between UEs and network and is used for UEs having no RRC connection with the network. The MCCH is a point-to-multipoint downlink channel used for transmitting multimedia broadcast multicast service (MBMS) control information from the network to the UE, for one or several MTCHs and is only used by UEs that receive MBMS. The DCCH is a point-to-point bi-directional channel that transmits dedicated control information between a UE and the network and is used by the UE having an RRC connection.

Traffic channels are used for the transfer of user plane information. The DTCH is a point-to-point channel dedicated to one UE, for the transfer of user information. The DTCH can exist in both uplink and downlink. The MTCH is a point-to-multipoint downlink channel for transmitting traffic data from the network to the UE and is only used by UEs that receive MBMS.

The transport channels are classified by how and with what characteristics data are transferred over the radio interface. The BCH is broadcasted in the entire coverage area of the cell and has fixed, pre-defined transport format. The DL-SCH is characterized by support for hybrid automatic repeat request (HARQ), support for dynamic link adaptation by varying the modulation, coding and transmit power, possibility to be broadcast in the entire cell, possibility to use beamforming, support for both dynamic and semi-static resource allocation, support for UE discontinuous reception (DRX) to enable UE power saving and support for MBMS transmission. The PCH is characterized by support for UE discontinuous reception (DRX) to enable UE power saving and requirement to be broadcast in the entire coverage area of the cell. The MCH is characterized by requirement to be broadcast in the entire coverage area of the cell, support for MBMS Single Frequency Network (MBSFN) combining of MBMS transmission on multiple cells.

Uplink transport channels are a UL-SCH and a random access channel (RACH). The UL-SCH is characterised by support for dynamic link adaptation by varying the transmit power and potentially modulation and coding, support for HARQ and support for both dynamic and semi-static resource allocation. The RACH is characterised by limited control information and collision risk.

FIG. 8 shows mapping between downlink transport channels and downlink physical channels. FIG. 9 shows mapping between uplink transport channels and uplink physical channels.

Referring to FIGS. 8 and 9, in downlink, a BCH can be mapped to a physical broadcast channel (PBCH). A MCH can be mapped to a physical multicast channel (PMCH). A PCH and a DL-SCH can be mapped to a physical downlink shared channel (PDSCH). The PBCH carries the BCH transport block. The PMCH carries the MCH. The PDSCH carries the DL-SCH and PCH. In uplink, a UL-SCH can be mapped to a physical uplink shared channel (PUSCH). A RACH can be mapped to a physical random access channel (PRACH). The PRACH carries a random access preamble.

There are several physical control channels used in the physical layer. A physical downlink control channel (PDCCH) informs the UE about the resource allocation of PCH and DL-SCH, and HARQ information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ AC/NAK in response to downlink transmission, scheduling request and channel quality indicator (CQI). The PUCCH is not transmitted simultaneously with the PUSCH from the same UE.

In order to provide various types of services, at least one RB may be configured. The RB is a logical link provided by the first and second layers among radio protocols between the UE and the network. A logical channel is allocated to an RB. A plurality of logical channels corresponding to a plurality of RBs are multiplexed and transmitted through one transport channel.

Each RB may have different logical channel priority (LCP) or equal LCP. Hereinafter, a method of transmitting data based on the LCP will be described.

I. In Case of Different LCPs

When a plurality of RBs are multiplexed and transmitted through a transport channel, a MAC layer can determine amounts of transmission data of the RBs by using the following rules with respect to given radio resources whenever data is transmitted.

(1) Amounts of transmission data are determined in the descending order of LCPs of the RBs. Data corresponding to the maximum prioritized bit rate (PBR) for each RB is determined as an amount of transmission data.

(2) In a case where radio resources remains, amounts of transmission data are determined in the descending order of the LCPs, again, with respect to the multiplexed RBs.

For example, when the LCPs range from 1 to 8, it is assumed that 1 is the highest priority and 8 is the lowest priority. The PBR is the minimum bit rate that is guaranteed by the RB. Even in a case where a wireless environment is very poor, a wireless communication system needs to provide the minimum bit rate. The PBR may ranges from zero to infinity.

An LCP and/or a PBR information of an RB are transmitted from an RRC layer of a network to an RRC layer of an UE through an RB configuration message when the RB is initially configured. The RRC layer of the UE which receives the RB configuration message configures a RB and sends information on the LCP and the PBR of the RB to the MAC layer of the UE. The MAC layer that receives the information determines amounts of transmission data of the RB according to the aforementioned rules with respect to given radio resources for each transmission time interval (TTI). Hereinafter, the TTI is referred to as an interval to transmit data through one transport channel.

FIG. 10 illustrates an example of a method of transmitting data with different LCPs.

Referring to FIG. 10, three RBs RB1 to RB3 are multiplexed in one transport channel. Here, it is assumed that LCP1 of the RB1 is 1, LCP2 of the RB2 is 3, LCP3 of the RB3 is 5, BR1 of the RB1 is 300 bit/TTI, PBR2 of the RB2 is 400 bit/TTI, and PBR3 of the RB3 is 100 bit/TTI. The size of a transport block that is allocated to a transport channel is 1700 bits. The size of the transport block is the size of radio resources allocated to the transport channel and may vary for each TTI according to channel condition.

A buffer occupancy BO1 of the RB1 is 700 bits, a buffer occupancy BO2 of the RB2 is 1500 bits, and a buffer occupancy BO3 of the RB3 is 600 bits. A buffer occupancy (BO) is an amount of a buffer currently occupied by data. The occupied data can be divided into data corresponding to the PBR and the other data. Hereinafter, the data corresponding to the PBR among BOs of the RBs is called as PBR data and the other data is called as remaining data.

First, the MAC layer fills the transport block with the PBR data of RBs in the descending order of the LCPs with respect to given radio resources to the extent of the maximum PBR. In the example of FIG. 10, the LCP1 of the RB1 is the highest, the LCP2 of the RB2 is the next highest, and the LCP3 of the RB3 is the lowest. Thus, amounts of transmission data are determined in the order of RB1, RB2 and RB3, to the extent of the PBR. That is, the transport block is filled with 800 bits of PBR data in the order of the PBR1 of the RB1 of 300 bits, the PBR2 of the RB2 of 400 bits, and the PBR3 of the RB3 of 100 bits.

Next, in a case where radio resources remain in the transport block, the transport block is filled with the remaining data of the RBs in the descending order of the LCPs. In the example of FIG. 10, since the amount of the data of the RBs is filled according to the PBRs is 800 bits with respect to the transport block of the 1700 bits, extra resources of 900 bits remain. Accordingly, the transport block is filled with remaining data in the descending order of the LCPs. That is, all the remaining data of 400 bits of the RB1 having the highest LCP are firstly filled. Then, remaining data of the RB2 is filled with extra resources of 500 bits.

Finally, in this TTI, the determined amounts of transmission data of the RBs are RB1=700 bits, RB2=900 bits, and RB3=100 bits. The determined transmission data is carried by the one transport block.

The order of filling the transport block with data of RBs in the transport block depends on an embodied method. In FIG. 10, the transport block is filled with data according to a rule for determining amounts of data so as to show a method of determining amounts of data.

II. In Case of Equal LCPs

In a case where the RBs having equal LCPs are multiplexed, a method of clear processing the RBs is needed. As a communication system has been developed, a network has to concurrently provide a plurality of services to UEs. Thus, a plurality of RBs with equal priorities can be configured. If a method of efficiently processing the RBs having equal LCPs is not defined, quality of service for RBs cannot be guaranteed. Accordingly, it is necessary to efficiently determine amounts of transmission data so that quality of service is not deteriorated even in a case where RBs having equal priorities are multiplexed.

When the RBs having equal LCPs are multiplexed, it is possible to determine amounts of transmission data of the RBs in the following method.

II-1. Equal Amount Allocation

It is possible to allocate equal amounts of transmission data to the RBs with equal LCPs. However, since PBRs are configured in the RBs, there are two methods based on whether the PBR allocation is included or not.

FIG. 11 illustrates a method of allocating equal amounts of transmission data except PBR allocation. This means equal allocation of remaining resources after PBR allocation. First, amounts of transmission data are allocated to the extent of the PBRs of the RBs. The equal amounts of transmission data are allocated to the RBs with respect to the remaining radio resources. Conditions of FIG. 11 are the same as those of FIG. 10 except that the LCPs of the RB2 and the RB3 are 5's.

Referring to FIG. 11, first, amounts of transmission data are allocated to the RBs in the descending order of the LCPs to the extent of the PBRs. That is, the RB1 allocates the PBR1 of 300 bits. Since the RB2 and the RB3 have equal LCPs, the RB2 and the RB3 allocate the PBR2 of 400 bits and the PBR3 of 100 bits in any order. In the example of FIG. 11, the amount of transmission data is firstly allocated to the RB2. However, since the LCPs of the RB2 and the RB3 are equal, the amount of transmission data may be firstly allocated to the RB3.

Amounts of transmission data are firstly allocated to the extent of the PBRs of the RBs. When radio resources remains in the transport block, the remaining radio resources are allocated in the descending order of the LCPs. 800 bits of the transport block having 1700 bits are allocated according to the PBRs of RBs, and 900 bits remain. Therefore, 400 bits to which all the remaining data can be transmitted are allocated to the RB1 having the highest priority. Then, 250 bits are respectively allocated to the RB2 and the RB3 by equally dividing the remaining 500 bits.

In this TTI, the determined amounts of transmission data of the RBs are RB1=700 bits, RB2=650 bits, and RB3=350 bits. The determined transmission data is carried by the one transport block.

The order of filling the transport block with data of the RBs depends on an embodied method. In FIG. 10, the transport block is filled with data according to a rule for determining amounts of data so as to show a method of determining amounts of data.

FIG. 12 illustrates a method of allocating equal amounts of transmission data including PBR allocation. This means equal allocation of total resources including PBR allocation. In this method, entire amounts of transmission data allocated to RBs having equal LCPs are the same regardless of PBRs of the RBs. This condition is the same as that of FIG. 11.

Referring to FIG. 12, amounts of transmission data are allocated to RBs in the descending order of LCPs to the extent of the PBRs. That is, 300 bits of PBR1 are allocated for the RB1. Since the RB2 and the RB3 have equal LCPs, 400 bits of PBR2 for the RB2 and 100 bits of PBR3 for the RB3 are allocated arbitrarily.

Then, since radio resources of 900 bits remain, the remaining radio resources are allocated in the descending order of the LCPs. 400 bits to which all the remaining data can be transmitted are allocated to the RB1 having the highest priority. The remaining 500 bits are allocated to the RB2 and the RB3. In this time, 100 bits and 400 bits are allocated respectively to the RB2 and the RB3 so that the entire amounts of transmission data of the RB2 and the RB3 are equal.

Finally, in this TTI, the determined amounts of transmission data of the RBs are RB1=700 bits, RB2=500 bits, and RB3=500 bits. The determined transmission data are carried by one transport block.

The order of filling the transport block with data of the RBs depends on an embodied method. In FIG. 10, the transport block is filled with data according to a rule for determining amounts of data so as to show a method of determining amounts of data.

II-2. Prioritization with New Criterion

If LCPs of RBs are equal, priorities of the RBs are not determined based on the LCPs. The priorities may be determined based on a new criterion. A new criterion may be a buffer occupancy (BO), a PBR, a maximum bit rate (MBR), a buffer latency period of data, or a TTI. Various criteria may be available.

FIG. 13 illustrates a method of enabling an RB having a lower PBR to have a higher priority with respect to RBs having equal LCPs. That is, in the RBs having equal LCPs, PBRs are used instead of LCPs.

Referring to FIG. 13, first, the MAC layer determines that an RB having a lower PBR has a higher priority by comparing PBRs of the RBs having the equal LCPs when RBs are configured. In the example of FIG. 13, although the LCPs of the RB2 and the RB3 are 5's, the PBR2 is 400 bits, and the PBR3 is 100 bits. Since the PBR3 is lower than the PBR2, the RB3 has a higher priority than the RB2. After determining priorities of the RBs, amounts of transmission data are allocated.

First, amounts of transmission data are allocated to the RBs in the descending order of priorities that are determined according to the LCPs or PBRs of the RBs. That is, 300 bits of the PBR1 are allocated to the RB1, 100 bits of the PBR3 are allocated to the RB3 having the next higher priority, and finally, 400 bits of the PBR2 are allocated to the RB2.

Then, since radio resources of 900 bits remain, the remaining radio resources are allocated in the descending order of priorities determined according to the LCPs or PBRs. First, 400 bits to which all the remaining data can be transmitted are allocated to the RB1 having the highest priority, and 500 bits to which all the remaining data can be transmitted are allocated to the RB3 having the next highest priority. Now, no more radio resource remains. Thus, an amount of transmission data is not allocated to the RB2 having the lowest priority.

Finally, in this TTI, the determined amounts of transmission data of the RBs are RB1=700 bits, RB2=400 bits, and RB3=600 bits. The determined transmission data is carried by the one transport block.

The order of filling the transport block with data of the RBs depends on an embodied method. In FIG. 10, the transport block is filled with data according to a rule for determining amounts of data so as to show a method of determining amounts of data.

Here, although priorities of the RBs having the equal LCP are determined in the descending order of PBRs, priorities of the RBs may be determined in the ascending order of PBRs. Selectively, priorities of the RBs may be determined by using a new criterion such as a BO, an MBR, a buffer latency period of data, and the like.

A criterion that is a PBR is used to determine priorities of RBs having the equal LCPs. Alternatively, various criteria or a combination of various criteria may be used. For example, priorities of the RBs having the equal LCPs may be determined in the ascending order of BOs/PBRs. If this criterion is applied to the example of FIG. 13, although the RB2 and the RB3 have the equal LCPs, a BO/PBR of the RB3 is greater than that of the RB2. Accordingly, the RB3 has a higher priority than the RB2. For another example, a TTI can be a candidate for the criterion. For example, for 3 RBs having equal logical channel priorities, we can prioritize them cyclically based on transmission time, i.e. RB1>RB2>RB3 for 1st TTI, RB2>RB3>RB1 for 2nd TTI, RB3>RB1>RB2 for 3rd TTI, and so on. An advantage of this method is that, whatever criterion is used, a UE can just consider one RB at a time. Thus, it can alleviate UE's complexity.

II-3. Method of Allocating Amounts of Transmission Data of RBs According to a Ratio of a New Criterion by Configuring the New Criterion Instead of the LCPs.

In this method, amounts of transmission data are allocated to the RBs having the equal LCPs according to a ratio of a criterion. At this time, the amounts of transmission data may be allocated according to the criterion such as a BO, a PBR, an MBR, a buffer latency period of data, a TTI, and the like. Various criteria may be available. Selectively, a combination of various criteria may be used. That is, various criteria such as a BO/PBR, an MBR/PBR, and the like may be available.

There are two methods based on whether the determined criterion applied to allocation of amounts of transmission data includes PBR allocation or excludes PBR allocation.

FIG. 14 illustrates a method of allocating amounts of transmission data according to a ratio of a criterion except PBR allocation. First, amounts of transmission data are allocated to the extent of the PBRs of the RBs. The amounts of transmission data are allocated to the RBs with respect to the remaining radio resources according to the ratio of the criterion. Here, a BO is used as the criterion.

Referring to FIG. 14, amounts of transmission data are allocated to RBs in the descending order of LCPs to the extent of the PBRs. That is, 300 bits of the PBR1 are allocated for the RB1. Since the RB2 and the RB3 have equal LCPs, 400 bits of the PBR2 for the RB2 and 100 bits of the PBR3 for the RB3 are allocated in any order.

Amounts of transmission data are firstly allocated to the extent of the PBRs of the RBs. When radio resources remains, the remaining radio resources are allocated in the descending order of the LCPs. 800 bits of the transport block having 1700 bits are allocated according to the PBRs of RBs, and 900 bits remain. Therefore, 400 bits to which all the remaining data can be transmitted are allocated to the RB1 having the highest priority. Then, remaining 500 bits are allocated to the RB2 and the RB3. At this time, since the LCPs of the RB2 and the RB3 are equal, extra radio resources of 500 bits are allocated to the RB2 and the RB3 according to a ratio of BOs except the PBR allocation. That is, the RB2 has 1100 bits except the PBR2 among 1500 bits, and the RB3 has 500 bits except the PBR3 among 600 bits. Thus, a ratio of amounts of transmission data is 1100:500. When this ratio is applied to 500 bits, 344 bits and 156 bits are respectively allocated to the RB2 and the RB3.

Finally, in this TTI, the determined amounts of transmission data of the RBs are RB1=700 bits, RB2=744 bits, and RB3=256 bits. The determined transmission data are carried by the one transport block.

The order of filling the transport block with data of RBs depends on an embodied method. In FIG. 10, the transport block is filled with data according to a rule for determining amounts of data so as to show a method of determining amounts of data.

FIG. 15 illustrates a method of allocating amounts of transmission data according to a ratio of a criterion including PBR allocation. In this method, amounts of transmission data are allocated to the RBs having the equal LCPs according to a ratio of the criterion regardless of PBRs. A BO is used as the criterion.

Referring to FIG. 15, amounts of transmission data are allocated to RBs in the descending order of LCPs to the extent of the PBRs. That is, 300 bits of PBR1 are allocated for the RB1. Since the RB2 and the RB3 has equal LCPs, 400 bits of the PBR2 for the RB2 and 100 bits of the PBR3 for the RB3 are allocated in any order. Then, since radio resources of 900 bits remain, the remaining radio resources are allocated in the descending order of LCPs.

First, 400 bits to which all the remaining data can be transmitted are allocated to the RB1 having the highest priority, and remaining 500 bits are allocated to the RB2 and the RB3. At this time, the amounts of transmission data are allocated to the RB2 and the RB3 according to a ratio of the BOs. The entire radio resources which can be used by the RB2 and the RB3 are 1000 bits including 500 bits allocated to the PBRs. When the radio resources are divided according to a ratio of 1500:600, the amounts of transmission data of the RB2 and the RB3 are 714 bits and 286 bits, respectively. When the already allocated PBR1 of 400 bits and PBR2 of 100 bits are excluded, amounts allocated to the remaining 500 bits are 314 bits and 186 bits, respectively.

Finally, in this TTI, the determined amount of transmission data of the RBs are RB1=700 bits, RB2=714 bits, and RB3=286 bits. The determined transmission data are carried by the one transport block.

The order of filling the transport block with data of the RBs depends on an embodied method. In FIG. 10, the transport block is filled with data according to a rule for determining amounts of data so as to show a method of determining amounts of data.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. In a wireless telecommunication system, a method of allocating radio resources for each of a plurality of logical channels, wherein each of the logical channels has a corresponding priority, the method comprising:

receiving at least one signal which defines a priority corresponding to each of the logical channels;

allocating radio resources for a first amount of data associated with each of the logical channels, wherein the allocation of radio resources is based on the priority corresponding to each of the logical channels; and allocating remaining radio resources for a second amount of data associated with each of two or more of the logical channels, the two or more logical channels, wherein the second amount of data associated with each of the two or more logical channels is in addition to the first amount of data associated with each of the two or more logical channels, wherein the two or more logical channels have the same priority, and wherein the remaining radio resources are allocated equally for the two or more logical channels.

2. The method of claim 1 further comprising:

allocating remaining radio resources for a second amount of data associated with one or more of the logical channels other than the two or more logical channels, the allocation of remaining radio resources for the second amount of data associated with the one or more logical channels occurring before the allocation of remaining radio resources for the second amount of data associated with the two or more logical channels, wherein each of the one or more logical channels has a corresponding priority that is higher than the priority corresponding to each of the two or more logical channels.

3. The method of claim 1, wherein the first amount of data associated with each of the logical channels is a minimum amount of data to be allocated for each of the plurality of logical channels, and wherein the minimum amount of data to be allocated for each of the plurality of the logical channels is based on a prioritized bit rate (PBR) for each of the plurality of logical channels.

4. The method of claim 3, wherein the wireless telecommunication system employs a radio interface protocol architecture that includes a radio resource control (RRC) layer, and wherein the minimum amount of data for each of the plurality of logical channels is determined by information received from the RRC layer.

5. The method of claim 3, wherein the minimum amount of data for each of the plurality of logical channels is associated with a corresponding radio bearer (RB).

6. The method of claim 3, wherein allocating radio resources based on the priority corresponding to each of the logical channels comprises:

allocating the minimum amount of data for each of the plurality of logical channels in order of the priority corresponding to each of the plurality of logical channels.

7. The method of claim 3, wherein the wireless telecommunication system employs a radio interface protocol architecture that includes a radio resource control (RRC) layer, and wherein the priority corresponding to each of the plurality of logical channels is determined by information received from the RRC layer.

8. The method of claim 3, wherein the wireless telecommunication system employs a radio interface protocol architecture that includes a medium access control (MAC) layer, and wherein the radio resources and the remaining radio resources are allocated by the MAC layer.

9. The method of claim 8 further comprising:

transmitting the minimum amount of data and the second amount of data from the MAC layer to a lower layer.

10. The method of claim 9, wherein the lower layer is a physical (PHY) layer.

11. The method of claim 10 further comprising:

multiplexing the minimum amount of data and the second amount of data onto a transport block, wherein transmitting the minimum amount of data and the second amount of data comprises transmitting the transport block over a transport channel to the PHY layer.

12. The method of claim 9, wherein transmitting the minimum amount of data and the second amount of data from the MAC layer to a lower layer of the radio interface protocol comprises:
  transmitting the minimum amount of data and the second amount of data in a transmission time interval (TTI).

13. The method of claim 1 further comprising:
  allocating the radio resources and the remaining radio resources to a transport channel.

14. The method of claim 1, wherein the radio resources and the remaining radio resources are associated with a transport block (TB).

15. In a wireless telecommunication system, an apparatus that allocates radio resources for each of a plurality of logical channels, wherein each of the logical channels has a corresponding priority, the apparatus comprising:
  means for allocating radio resources for a first amount of data associated with each of the logical channels, wherein said means for allocating radio resources for the first amount of data associated with each of the logical channels allocates the radio resources based on the priority corresponding to each of the logical channels; and
  means for allocating remaining radio resources for a second amount of data associated with each of two or more of the logical channels, wherein the second amount of data associated with each of the two or more logical channels is in addition to the first amount of data associated with each of the two or more logical channels, wherein the two or more logical channels have the same priority, and wherein said means for allocating the remaining radio resources allocates the remaining radio resources equally for the two or more logical channels.

16. The apparatus of claim 15 further comprising:
  means for allocating remaining radio resources for a second amount of data associated with one or more of the logical channels other than the two or more logical channels, the allocation of remaining radio resources for the second amount of data associated with the one or more logical channels occurring before the allocation of remaining radio resources for the second amount of data associated with the two or more logical channels, wherein each of the one or more logical channels has a corresponding priority that is higher than the priority corresponding to each of the two or more logical channels.

17. The apparatus of claim 15, wherein the first amount of data associated with each of the logical channels is a minimum amount of data to be allocated for each of the plurality of logical channels, and wherein the minimum amount of data to be allocated for each of the plurality of the logical channels is based on a prioritized bit rate (PBR) for each of the plurality of logical channels.

18. The apparatus of claim 17, wherein the wireless telecommunication system employs a radio interface protocol architecture that includes a radio resource control (RRC) layer, and wherein the minimum amount of data for each of the plurality of logical channels is determined by information received from the RRC layer.

19. The apparatus of claim 17, wherein the minimum amount of data for each of the plurality of logical channels is associated with a corresponding radio bearer (RB).

20. The apparatus of claim 17, wherein said means for allocating radio resources based on the priority corresponding to each of the logical channels comprises:
  means for allocating the minimum amount of data for each of the plurality of logical channels in order of the priority corresponding to each of the plurality of logical channels.

21. The apparatus of claim 17, wherein the wireless telecommunication system employs a radio interface protocol architecture that includes a radio resource control (RRC) layer, and wherein the priority corresponding to each of the plurality of logical channels is determined by information received from the RRC layer.

22. The apparatus of claim 17, wherein the wireless telecommunication system employs a radio interface protocol architecture that includes a medium access control (MAC) layer, and wherein said means for allocating the radio resources and said means for allocating the remaining radio resources are associated with the MAC layer.

23. The apparatus of claim 22 further comprising:
  means for transmitting the minimum amount of data and the second amount of data from the MAC layer to a lower layer.

24. The apparatus of claim 23, wherein the lower layer is a physical (PHY) layer.

25. The apparatus of claim 24 further comprising:
  means for multiplexing the minimum amount of data and the second amount of data onto a transport block, wherein said means for transmitting the minimum amount of data and the second amount of data comprises means for transmitting the transport block over a transport channel to the PHY layer.

26. The apparatus of claim 23, wherein said means for transmitting the minimum amount of data and the second amount of data from the MAC layer to a lower layer of the radio interface protocol comprises:
  means for transmitting the minimum amount of data and the second amount of data in a transmission time interval (TTI).

27. The apparatus of claim 15 further comprising:
  means for allocating the radio resources and the remaining radio resources to a transport channel.

28. The apparatus of claim 15, wherein the radio resources and the remaining radio resources are associated with a transport block (TB).

* * * * *

UNITED STATES PATENT AND TRADEMARK OFFICE
CERTIFICATE OF CORRECTION

PATENT NO. : 7,894,395 B2
APPLICATION NO. : 12/312781
DATED : February 22, 2011
INVENTOR(S) : Seung June Yi et al.

It is certified that error appears in the above-identified patent and that said Letters Patent is hereby corrected as shown below:

Column 12, claim 1, line 3, delete "the two or more logical channels,".

Signed and Sealed this
Twenty-first Day of June, 2011

David J. Kappos
*Director of the United States Patent and Trademark Office*